(12) United States Patent
Venkatachary et al.

(10) Patent No.: US 7,624,226 B1
(45) Date of Patent: Nov. 24, 2009

(54) NETWORK SEARCH ENGINE (NSE) AND METHOD FOR PERFORMING INTERVAL LOCATION USING PREFIX MATCHING

(75) Inventors: Srinivasan Venkatachary, Sunnyvale, CA (US); Pankaj Gupta, Palo Alto, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 412 days.

(21) Appl. No.: 11/614,075

(22) Filed: Dec. 20, 2006

Related U.S. Application Data

(60) Provisional application No. 60/752,645, filed on Dec. 20, 2005.

(51) Int. Cl.
*G06F 13/10* (2006.01)
(52) U.S. Cl. .................................................. 711/108
(58) Field of Classification Search .................. None
See application file for complete search history.

(56) References Cited

U.S. PATENT DOCUMENTS 6,553,002 B1 * 4/2003 Bremer et al. .............. 370/254
6,717,946 B1 * 4/2004 Hariguchi et al. ........... 370/392

OTHER PUBLICATIONS

Sharma, S. and Panigrahy, R., "Sorting and Searching Using Ternary CAMs", IEEE Computer Society, Proceedings of the 10th Symposium on High Performance Interconnects Hot Interconnects (HotI'02), May 2002, 6 pages.

* cited by examiner

*Primary Examiner*—Tuan V Thai
*Assistant Examiner*—Duc T Doan
(74) *Attorney, Agent, or Firm*—Mahamedi Paradice Kreisman LLP; William L. Paradice, III

(57) ABSTRACT

A communication network, networking device and method is provided herein for locating (i.e., searching for) an interval of numbers i within a set of numbers N given a point P. The search algorithm provided herein provides fast search speed (e.g., requires only one memory access) with minimum storage requirements (e.g., consumes up to, but not exceeding, N entries within a memory device).

9 Claims, 5 Drawing Sheets

| Node in NSE | prefixL | prefixR | Pointer_ltprefixL | Pointer_middle | Pointer_geprefixR |
|---|---|---|---|---|---|
| X | k3 | k4 | 2 | 3 | 4 |
| S | X | k5 | 2 | 4 | 5 |
| R | k1 | k2 | 0 | 1 | 2 |
| H | R | S | 0 | 2 | 5 |
| E | H | I | 0 | 5 | - |
| I | - | - | 5 | - | - |
| A | E | - | 0 | - | - |

NETWORK SEARCH ENGINE (NSE) AND METHOD FOR PERFORMING INTERVAL LOCATION USING PREFIX MATCHING

CROSS-REFERENCE TO RELATED APPLICATIONS

This application claims priority from, and hereby incorporates by reference, U.S. Provisional Application No. 60/752,645, filed Dec. 20, 2005 and entitled NETWORK SEARCH ENGINE (NSE) AND METHOD FOR PERFORMING INTERVAL LOCATION USING PREFIX MATCHING.

BACKGROUND OF THE INVENTION

1. Field of the Invention

This invention relates to high speed processing in computer servers and in computer networking and, more particularly, to devices and methods for performing interval location.

2. Description of the Related Art

The following descriptions and examples are given as background only.

Computer networking is generally recognized as the communication of packets across an interconnected network of computers. One objective of networking is to quickly forward the packets from a source to a destination. Thus, one or more forwarding devices may be placed within the network for performing such a function. As used herein, the term "forwarding devices" can be used interchangeably to refer to gateways, bridges, switches, or routers.

A forwarding device typically includes a lookup table containing a representation of at least a portion of the network topology, as well as current information about the best known paths (or "routes") from the forwarding device to one or more destination addresses. For example, a forwarding device may store address prefixes (or "prefix entries") and next hop identifiers in a lookup table. The prefix entries generally represent a group of destination addresses that are accessible through the forwarding device, whereas next hop identifiers represent the next device along the path to a particular destination address. Other information may be stored within the lookup table, such as the outgoing port number, paths associated with a given route, time out values and one or more statistics about each route.

When an incoming address is received by a forwarding device, the address is compared to the prefix entries stored within the lookup table. If a match occurs, the packet of information associated with the address is sent to an appropriate output port of the forwarding device. As links within the network change, routing protocols sent between forwarding devices may change the prefix entries within the corresponding lookup tables. This change will modify not only the prefix entries within the lookup table, but also the next-hop identifiers pointed to by those prefix entries. Thus, routing through the forwarding devices can be dynamically changed (i.e., updated) as links go down and come back up in various parts of the network.

The Internet Protocol (IP) is the protocol standard most widely used for packet communication to and from the Internet. Internet Protocol (IP) addresses associated with a packet generally comprise a network field (for identifying a particular network) and a host field (for identifying a particular host on that network). All hosts on the same network have the same network field but different host fields. The network field may be of arbitrary length (as in class-based addressing architectures), or may be constrained to fixed network-host field boundaries (as in classless architectures).

In addition to determining the next hop for incoming packets, some forwarding devices may be configured for solving an interval location problem. Interval location problems show up in several places in a networking system, one example of which can be seen in queue scheduling for traffic management in routers and switches. Given a set of N numbers, $\{k_1, k_2 \ldots k_N\}$, and a point, P, the interval location problem is to find the interval, i, containing the point, P, where $1 \leq i < N$ and $k_i \leq P < k_{i+1}$. If $P < k_1$ or $P > k_N$, the integer values 0 and N are returned, respectively. Unfortunately, hashing cannot be used to solve the interval location problem because it is not an exact match operation.

In some cases, binary trees may be used to perform interval location using the longest-matching prefix technique. However, conventional search algorithms that use binary tree structures fail to provide an efficient solution to the interval location problem. For example, most conventional algorithms require log N operations (i.e., memory accesses) to perform an interval search, and an additional log N operations to carry out updates. This means that, if N=64K (typical number of queues in a large switch or router), approximately 16 memory accesses would be required to carry out a search or update operation. In addition to providing long search/update times, the binary tree structures used in most conventional search algorithms may include approximately 2N nodes. Considering that each node has at least two pointers (say 4 Bytes each) for a binary representation, the total space required to store the data structure may be approximately 2×64K×2×4=1 MB=8 Mb. Even though a data structure of this size may be stored within a fast SRAM with 4 ns random access time, 16 memory accesses would still require 64 ns per search operation. Such time consumption is not sufficient to support modem data transmission rates (such as 10 Gbps OC-192, whose rates require 40 ns per operation). This calculation does not even consider the time needed to update the data structure, which could potentially add another 64 ns per packet.

Therefore, a need remains for an improved interval location algorithm for performing fast interval search and update operations. Due to the high cost per bit associated with such algorithms, it would also be desirable to minimize the amount of storage space required for storing a related data structure.

SUMMARY OF THE INVENTION

The following description of various embodiments of communication networks and methods is not to be construed in any way as limiting the subject matter of the appended claims.

According to one embodiment, a method is provided herein for locating an interval of numbers i within a set of numbers N given a point P. In some cases, the method may begin by searching a first database of entries, each entry comprising W-bits, to find an entry having the most number of bits in common with the point P. In some cases, the step of searching may include finding the longest matching prefix entry corresponding to the point P. In accordance with one aspect of the invention, the first database of entries may be stored within a network search engine (NSE), and may include a plurality of branch nodes obtained by representing the set of numbers N in a binary tree configuration. As such, the longest matching prefix entry may correspond to one of the branch nodes (say Z) stored within the NSE.

Once the longest matching entry is found, the method may continue by accessing a second database of entries to obtain information relating to the entry found to have the most number of bits in common with the point P. In accordance with one aspect of the invention, the second database of entries may be stored within a memory device associated with, but located external to, the NSE, and may include a table containing a set of values for each of the plurality of branch nodes. In one embodiment, the set of values may include five values, described herein as prefixL, prefixR, pointer_ltprefixL, pointer_middle and pointer_geprefixR, for each of the branch nodes within the NSE.

Once the set of values for a given branch node (Z) is obtained, the method may continue by comparing the point P with the corresponding set of values to locate the interval of numbers i containing the point P. For example, the method may compare the point P against the left and right prefix entries surrounding Z—prefixL(Z) and prefixR(Z)—to determine which of the three pointers (pointer_ltprefixL, pointer_middle or pointer_geprefixR) should be returned from the associated memory device to locate the interval of numbers i containing the point P.

According to another embodiment, a method is provided herein for updating a database containing a set of numbers N. In the exemplary embodiment provided, the method may be used for inserting a new number Y into the original set of numbers N.

According to another embodiment, a networking device is provided for carrying out interval-related operations in accordance with the search and update algorithms provided herein.

BRIEF DESCRIPTION OF THE DRAWINGS

Other objects and advantages of the invention will become apparent upon reading the following detailed description and upon reference to the accompanying drawings in which.

Figure 1:
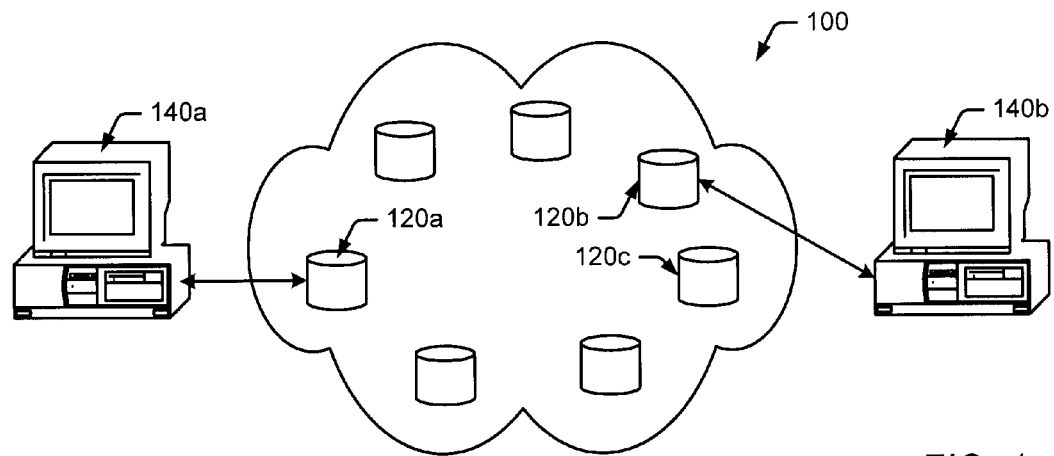
FIG. 1 is a block diagram of a communication network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Although the term "network" is specifically used throughout this disclosure, the term network is defined to include the Internet and other network systems, including public and private networks that use the Internet Protocol (IP) protocol suite for data transport. Examples include the Internet, Intranets, extranets, telephony networks ("using voice over IP"), and other wire-line and wireless networks that converge on the use of the IP family of protocols. Although the term "Internet" may be used throughout this disclosure, the term Internet is merely one example of an IP "network."

I. Exemplary Communication Network and Network Devices

FIG. 1 illustrates possibly numerous forwarding devices 120 within a computer network 100. The topology of the Internet or the Intranet interposed between computers 140 can vary. If computer 140a wishes to send a packet of data to computer 140b, then it must do so by traversing one or more forwarding devices 120 within network 100. Forwarding device 120a might receive the packet, which includes a destination address of, for example, forwarding device 120b (or computer 140b). Determining where to send the packet within network 100 so that the packet arrives at a forwarding device (or hop) closer to the destination, is essentially the function of the routing table within the forwarding device 120a. Optimally, the routing table within forwarding device 120a will receive the destination address, and will compare that address (or "search key") to prefix entries stored within the routing table. Associated with each prefix entry might be a next hop identifier. Thus, once a prefix entry is found that matches the destination address (using, for example, the longest prefix match comparison), the packet can be routed to the next hop to be one step closer to the intended destination.

Figure 2:
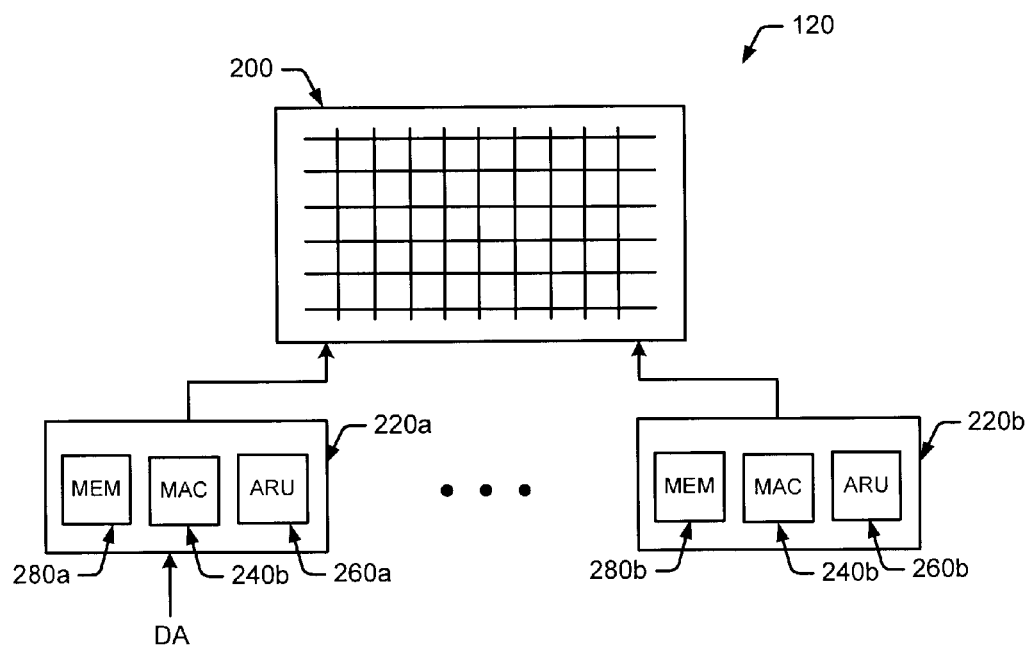
FIG. 2 is a block diagram of a packet-forwarding engine, or "forwarding device" (e.g., a switch or router), within the communication network of FIG. 1.

FIG. 2 illustrates one example of forwarding device 120, such as a router, gateway, bridge, or switch. Forwarding device 120 is often called a "packet-forwarding engine" and may contain a switching fabric 200 and a plurality of line cards 220. Switching fabric 200 is generally well known, and may involve a crossbar switch that interconnects all the line cards with one another. At least one line card may contain a routing processor. Forwarding device 120 can, therefore, be thought of as performing at least two functions: (i) performing route lookup based on the destination address of the packet in order to identify an outgoing port; and (ii) switching the packet to the appropriate output port.

The routing function can be performed primarily on the incoming line card (e.g., line card 220a), whereas switching of the packet to the appropriate output port or line card can take place within switching fabric 200. The Destination Address (DA) of the packet can enter line card 220a via an I/O interface. Each line card typically includes a Media Access Controller (MAC) 240, an Address Resolution Unit (ARU) 260, and a memory device 280. MAC 240 can be configured to accept many different communication protocols, such as, e.g., the Carrier Sense Multiple Access/Collision Detect (CSMA/CD), Fiber Distributed Data Interface (FDDI), or Asynchronous Transfer Mode (ATM) communication protocols. As packets are read from ingress MAC 240a, forwarding control information necessary for steering the packet through switching fabric 200 will be pre-appended and/or appended to those packets.

In some cases, the ARU 260 at the ingress line card may perform the routing function using the longest prefix match comparison technique. The ARU can perform classless or class-based routing functions and can support Variable Length Subnet Masks (VLSM). Each ARU can be reconfigured—as routes are added or deleted from the network—using well-known routing protocols, such as RIP, OSPF or BGP. The memory device 280 can be implemented in various types of Random Access Memory (RAM), such as DRAM, SRAM, or Content-Addressable Memory (CAM), a popular form of masking CAM being Ternary CAM (or TCAM). Memory 280 may contain various lookup tables, such as a routing table, a pointer table and/or a next hop table. If one or more of the lookup tables are copied and placed within the line card 220, lookups on incoming packets can be performed locally, without loading the central processor of forwarding device 120.

In some cases, additional lookup tables may be included to make the overall routing algorithm "flow-aware." Instead of routing individual packets of data using a best-effort service, for example, the packets can be classified into specific flows. Routers or switches that are flow-aware may be used to classify incoming packets according to differentiated services. All packets belonging to the same flow may be treated in a similar manner.

A collection of rules or policies can be defined to determine whether a packet belongs to a specific flow before the packet is sent to its next hop. The rules or policies define an action to be applied to the packet, such as denying or allowing access to a protected network. Rules or policies that specify a particular flow are often based on the source address, destination address, and other designators within the incoming packet. For example, a packet filtering technique may use a rule or policy for denying all traffic from a particular Internet service provider (ISP) destined to a particular address. In addition to packet filtering, various rules may be employed to provide policy routing, rate-limiting, and traffic shaping abilities to provide customers with a particular Quality of Service (QoS) level. Some or all of these rules may be defined within another lookup table—referred to herein as an access control list (ACL)—stored in a database.

Figure 3:
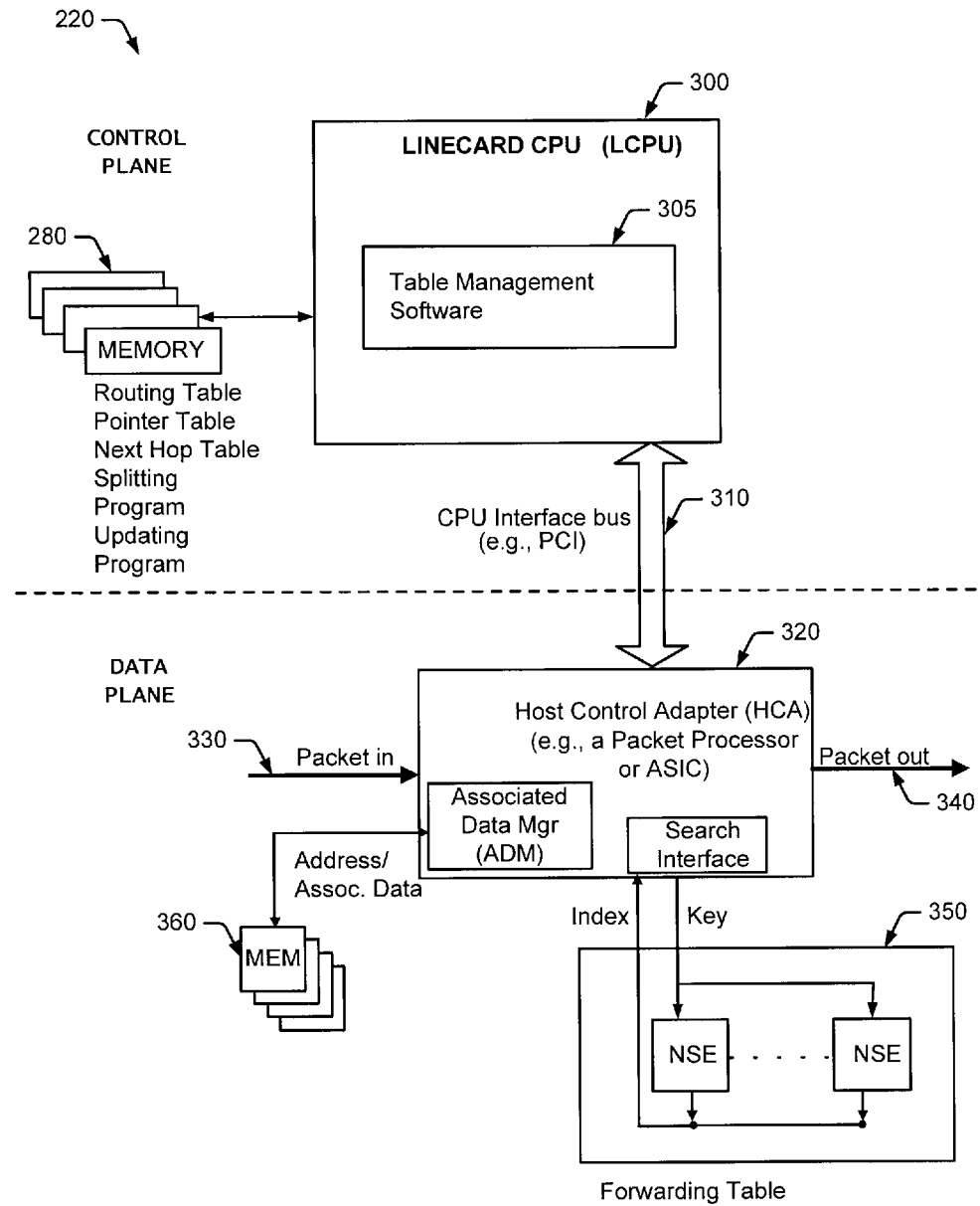
FIG. 3 is a block diagram of various software and hardware components that may be found within one or more line cards of the forwarding device of FIG. 2.

FIG. 3 illustrates various hardware and software components that may be included within one or more line cards 220 of forwarding device 120 (FIGS. 1 and 2). As will be described in more detail below, line card 220 may include one or more memory devices, each of which may be used for storing one or more lookup tables. Exemplary lookup tables may include, but are not limited to, routing tables, pointer tables, next hop tables, forwarding tables and ACL tables (which may include, e.g., filtering tables, Quality of Service tables, etc.).

As shown in FIG. 3, line card 220 may contain a Network Search Engine ("NSE") 350 in the data plane of the line card with supporting components in the control plane of the line card. In some cases, a central processor 300 (referred to as a line card CPU, or "LCPU") may be included within the control plane of line card 220 for managing the hardware components of the line card. For example, LCPU 300 may be configured for running table management software 305. In general, software 305 may be used to compute and maintain the lookup tables stored within memory 280 and NSE 350. Though control plane memory 280 may include substantially any type of memory device, a static or dynamic RAM device may be preferred in most embodiments of the invention. Control plane memory device 280 may be used for storing table management software 305, along with various lookup tables, including ACL tables, pointer tables, routing tables and next hop tables. The LCPU may communicate with the data plane components via interface bus 310.

Though a central processor (i.e., LCPU 300) is used herein for managing the forwarding database of a line card, such function should not be limited to a central processor in all embodiments of the invention. Other programmable units, such as, e.g., network processing units ("NPU"), custom designed Application Specific Integrated Circuits ("ASIC") or Field Programmable Gate Arrays ("FPGA") could replace LCPU 300 in alternative embodiments of the invention.

As shown in FIG. 3, a Host Control Adapter (HCA) 320 may be included within the data plane of line card 220 for handling and processing the data packets arriving at input port 330. HCA 320 could be, e.g., a custom-designed ASIC, FPGA or packet processor. The HCA is generally responsible for parsing the incoming data packets, extracting the destination address (or another search key), and performing the lookup in the forwarding tables stored within NSE 350. Though LCPU 300 and HCA 320 are both shown in the embodiment of FIG. 3, alternative embodiments of the invention may include only one processing device (e.g., LCPU 300 or HCA 320).

In some embodiments, NSE 350 may include an array of NSE modules (350a . . . 350m), in addition to the search engine software (not shown) that runs on the LCPU and manages the NSE array. The NSE array may be implemented in a variety of configurations, such as one search engine subsystem (i.e., one NSE array) on each line card in a distributed architecture, or one search engine subsystem on a centralized card. In a distributed architecture, control plane processing may be required for computing the forwarding table from the routing table. The control plane processing can be carried out independently on each line card, or on one centralized card.

As used here, the term "Network Search Engine" or "NSE" may refer to any device capable of: (i) storing a database of entries, (ii) using a search key to search for a particular entry within the database of entries and, as a result of the search, (iii) returning one or more indices of matching entries. In general, the entries stored within the database can be "exact match entries" (e.g., complete IP destination addresses), "prefix entries" (e.g., one or more most significant bits of the IP destination address followed by a masked entry), or "range interval entries" (e.g., ACL entries) which require interval location.

In a preferred embodiment, NSE 350 may include one or more Content Addressable Memory (CAM) devices (350a to 350m) for storing a plurality of database or table entries. Exemplary CAM devices include binary, ternary, and pseudo-ternary CAMs. Binary CAMs are generally configured for storing binary entries, or entries that contain only 0 or 1 values. However, ternary CAMs (TCAMs) may be preferred over binary CAMs, if enhanced flexibility is desired for storing or searching through the database entries. This is because TCAMs store ternary entries, or entries that contain 0, 1 and x values, where x is referred to as a "wildcard" or "don't care" specification. In some embodiments, a pseudo-ternary CAM may be used for storing a group of entries with a shared mask.

When data packets arrive at input port 330, HCA 320 parses the packet headers, and forms keys (i.e., search keys) for searching an appropriate database or table within the TCAM array 350. An index is returned to the HCA when an entry matching the search key is found. In some cases, the index may indicate the best matching route for the key. As part of processing the packet, the HCA uses this index to lookup (or locate) the attached memory device 360 (e.g., SRAM or DRAM) containing data associated with the best matching route. The lookup to memory 360 is performed using an address derived from the index returned by the NSE, and returns the relevant data associated with the best matching route. The HCA then uses the data to continue performing other packet processing functions before the packet is forwarded to the next hop via output port 340.

Interval location problems may arise when routing functions are performed based on intervals. Regardless of the particular application in which it is arises, the interval location problem can be defined as follows. Given a set of N numbers, $\{k_1, k_2 \ldots k_N\}$, and a point P the interval location problem is to find the interval i containing the point P where $1 \leq i < N$ and $k_i \leq P < k_{i+1}$. If $P < k_1$ or $P > k_N$, the integer values 0 and N are returned, respectively.

As noted above, one method for solving the interval location problem involves building a binary tree data structure from a set of N numbers. However, conventional search algorithms using binary tree structures often require log N number of memory accesses to perform a search operation, and an additional log N number of memory accesses to carry out updates (if necessary). Conventional search algorithms also require 2N nodes for storing the binary tree data structures, resulting in a total storage consumption of 2N×2 (pointers)×B, where B is the number of Bytes needed to store each pointer. Even when the data structures are stored within fast memory devices (e.g., a fast SRAM with 4 ns random access time), the large number (log N) of memory accesses required to perform an interval search or update operation makes it impossible for conventional search algorithms to support modern data transmission rates.

II. Exemplary Methods for Locating a Desired Interval Using a Network Search Engine (NSE) and Associated Memory Device Specialized search devices have been used for conducting fast searches in networking systems. For example, Network Search Engines (NSEs), including TCAMs and Longest Prefix Match (LPM) engines, are widely used in networking equipment for performing routing table lookups and multifield filter lookups within a single memory access. Recently, NSEs have been utilized for interval location.

FIGS. 4-7 illustrate an improved interval search algorithm providing fast search speed and minimum storage consumption. Instead of storing a data structure within a TCAM array of an NSE, the improved search algorithm utilizes storage space within both the NSE (350, FIG. 3) and the associated memory device (360). This reduces the number of TCAM entries needed for storing the data structure from 2N to N TCAM entries. Although a factor of 2 difference may seem trivial, it makes a significant difference to the cost of the solution, because of the high cost per bit of NSEs. For example, in a data structure containing N=64K numbers, each 64-bits wide (W), the difference may equate to about N×W=64K×64 bits=4 Mbits, which is currently priced at about $50 per 4 Mbits.

Figures 4, 5:
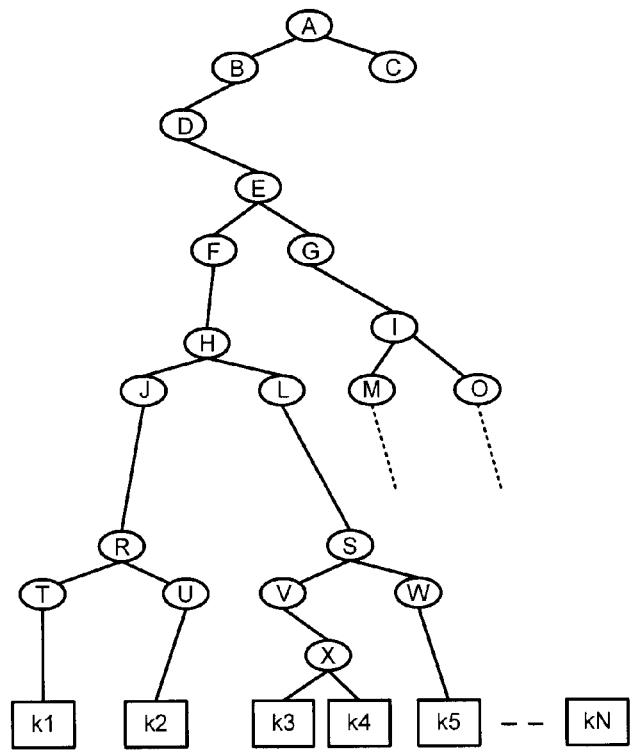
FIG. 4 is a plan diagram of a binary tree representation showing branch points of a set of N numbers $\{k_1, k_2 \ldots k_N\}$, according to one embodiment of the invention.
FIG. 5 is a table illustrating various types of information that may be stored within the associated memory device of FIG. 3 for each branch node in the binary tree representation of FIG. 4.

FIG. 4 illustrates one example of a 1-bit tree (or "trie") data structure 400 that may be used to represent the set of N numbers $\{k_1, k_2 \ldots k_N\}$, where each number contains W bits. To reduce the number of TCAM entries needed for storing the binary tree data structure, only the branch nodes (shaded in gray) of tree structure 400 are stored within the TCAM array 350. As used herein, a node is considered a "branch node" if it has both a left and a right child node. A branch node may, therefore, be a root node or an intermediate node within the binary tree data structure. In the embodiment of FIG. 4, root node A and intermediate nodes E, H, I, R, S and X may be stored with TCAM array 350 as "branch nodes." It is also worthwhile to note that each branch node in the array is the longest common ancestor (LCA) of a unique consecutive pair of original numbers $[k_i, k_{i+1}]$. For example, root node A is the LCA of numbers k4 and k5, node H is the LCA of k2 and k3, node S is the LCA of k3 and k4, etc.

In some cases, the branch nodes may be stored as "prefix entries" within the TCAM array. As noted above, a prefix entry may be described as an entry having one or more most significant bits, which are followed by a masked entry. In other cases, the entire entry may be stored within the TCAM array. Regardless, the prefix entries are formed by inserting the endpoints of the intervals into a binary tree. The branch nodes correspond to prefix entries, which in turn, correspond to the path from the root node to the branch node. The branch nodes are stored as prefix entries within the network search engine.

After the branch nodes are determined and stored within the TCAM array, tree structure 400 may be used for determining a set of values, which may then be stored within associated memory device 360 for each of the branch nodes within TCAM array 350. The information stored within the associated memory device (e.g., a SRAM) 360 may then be used to locate an interval i for a given point P.

For instance, the following set of values may be stored within the associated memory device 360 at index j for the prefix entry stored in the TCAM array at location j. If we assume that the TCAM entry represents branch node Z (not shown) in the 1-bit tree structure 400, the SRAM contents for branch node Z may include five fields: prefixL, prefixR, pointer_ltprefixL, pointer_middle and pointer_geprefixR. The values of the five fields for all the NSE entries shown in FIG. 4 is provided in the Table of FIG. 5.

In general, the value of the prefixL field can be an entry stored in the NSE (i.e., a branch node), or one of the original numbers $\{k_1, k_2 \ldots k_N\}$. In particular, the highest branch node in the left sub-trie of branch node Z is stored in this field. If there is no such branch node, the original number in the left sub-trie of node Z is stored (as a W-bit prefix). For example, referring to FIGS. 4 and 5, prefixL(R)=k1, prefixL(H)=R, prefixL(S)=X, etc.

In general, the value of the prefixR field may also be an entry stored in the NSE (i.e., a branch node), or one of the original numbers $\{k_1, k_2 \ldots k_N\}$. In particular, the highest branch node in the right sub-trie of branch node Z is stored in this field. If there is no such branch node, the original number in the right sub-trie of node Z is stored (as a W-bit prefix). For example, referring to FIGS. 4 and 5, prefixR(R)=k2, prefixR(H)=S, prefixR(S)=k5.

In addition to the left and right prefix fields, SRAM 360 may include three pointer fields for each branch node in TCAM array 350. A first pointer, pointer_ltprefixL, contains a pointer to the interval that "is less than prefixL." If prefixL is an original number $k_{i+1}$, the pointer_ltprefixL pointer points to an interval i=$(k_i, k_{i+1})$ with $k_i$ included. If prefixL(Z) is a branch node, the value of the pointer_ltprefixL field for branch node Z is identical to pointer_ltprefixL(prefixL(Z)). For example, referring to FIGS. 4 and 5, pointer_ltprefixL(X)= 2=pointer_ltprefixL(S).

A second pointer, pointer_middle, contains a pointer to the interval that lies "in the middle of prefixL and prefixR, including prefixL but not prefixR." In other words, pointer_middle contains a pointer to the interval, i, where prefixL$\leq$i<prefixR. For example, referring to FIGS. 4 and 5, pointer_middle (X)= 3 and pointer_middle(S)=4.

A third pointer, pointer_geprefixR, contains a pointer to the interval that is "greater than or equal to prefixR." In other words, pointer_geprefixR contains a pointer to the interval i where i$\geq$prefixR. For example, referring to FIGS. 4 and 5, pointer_geprefixR(X)=4 and pointer_geprefix(S)=5.

Figure 6:
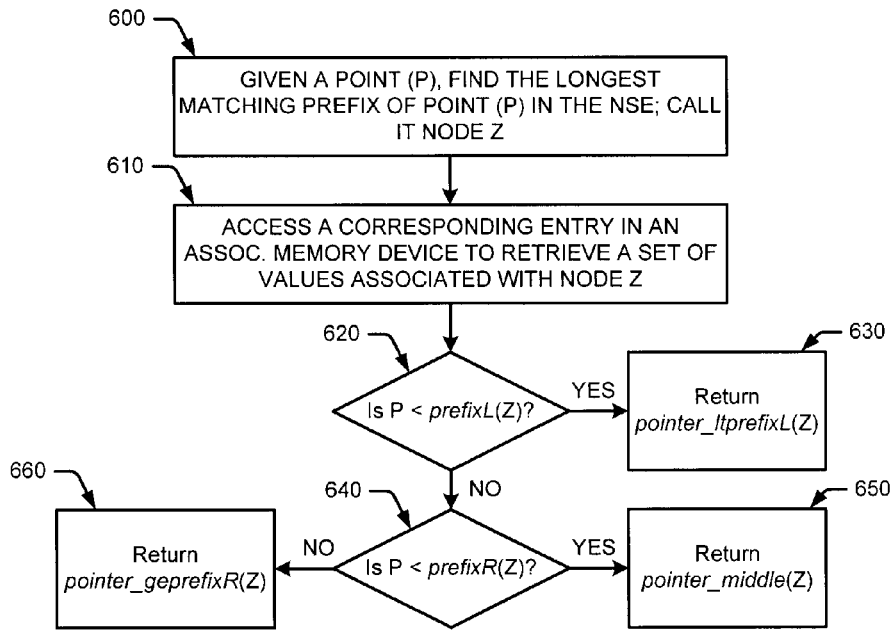
FIG. 6 is a flow chart diagram of a method, according to one embodiment of the invention, for performing an interval location search within the Network Search Engine (NSE) and associated memory device of FIG. 3.

FIG. 6 is a flow chart diagram illustrating one embodiment of a method for locating (i.e., searching for) an interval of numbers i within a set of numbers N given a point P. In some cases, the method may begin by searching a first database of entries (step 600), where the first data base of entries is stored within a network search engine (NSE). As noted above, the first database of entries may include a plurality of branch nodes obtained by representing the set of numbers N in a binary tree configuration. One example of such a tree structure is shown in FIG. 4. The branch nodes may be stored as prefix entries or exact match entries, each entry containing W-bits. The step of searching (step 600) may be performed to find an entry having the most number of bits in common with the given point P. For example, the first database of entries may be searched to find the longest matching prefix of the given point P.

After the longest matching prefix is found, a second database of entries may be accessed (in step 610) to obtain information relating to the entry found to have the most number of bits in common with the point P. As noted above, the second database of entries may be stored within a memory device associated with, but located external to, the NSE (such as associated memory device 360 of FIG. 3). In general, the second database of entries may include a table containing a set of values for each of the plurality of branch nodes. In one embodiment, the set of values for a particular branch node (Z) may include a branch node or original number residing in the left sub-trie of branch node Z (prefixL), a branch node or original number residing in the right sub-trie of branch node Z (prefixR), a pointer (pointer_ltprefixL) that is "less than prefixL," a pointer (pointer_middle) that is "in the middle of prefixL and prefixR, including prefixL but not prefixR," and a pointer (pointer_geprefixR) that is "greater than or equal to prefixR." Alternative and/or additional values may be included in the set of values in other embodiments of the invention.

In steps 620-660, the given point P is compared with some of the information obtained from the second database to locate the interval of numbers i containing the point P. If the point P is less than prefixL(Z) in step 620, the pointer value that is "less than prefixL" may be returned from the associated memory device 360 (in step 630). For example, if P=2 and the longest prefix match of P is branch node X, the associated memory device may return pointer_ltprefixL=2. If the point P is greater than or equal to prefixL(Z) in step 620, the method may determine whether P is less than prefixR(Z) in step 640.

If the point P is less than prefixR(Z) in step 640, the pointer value that lies "in the middle of prefixL and prefixR, including prefixL but not prefixR" may be returned from the associated memory device 360 (in step 650). For example, if P=4 and the longest prefix match of P is branch node S, the associated memory device may return pointer middle=4. If the point, P, is greater than or equal to prefixR(Z) in step 640, the pointer value that is "greater than or equal to prefixR" may be returned from the associated memory device 360 (in step 660). For example, if P=4 and the longest prefix match of P is branch node X, the associated memory device may return pointer_geprefixR=4.

Figure 7:
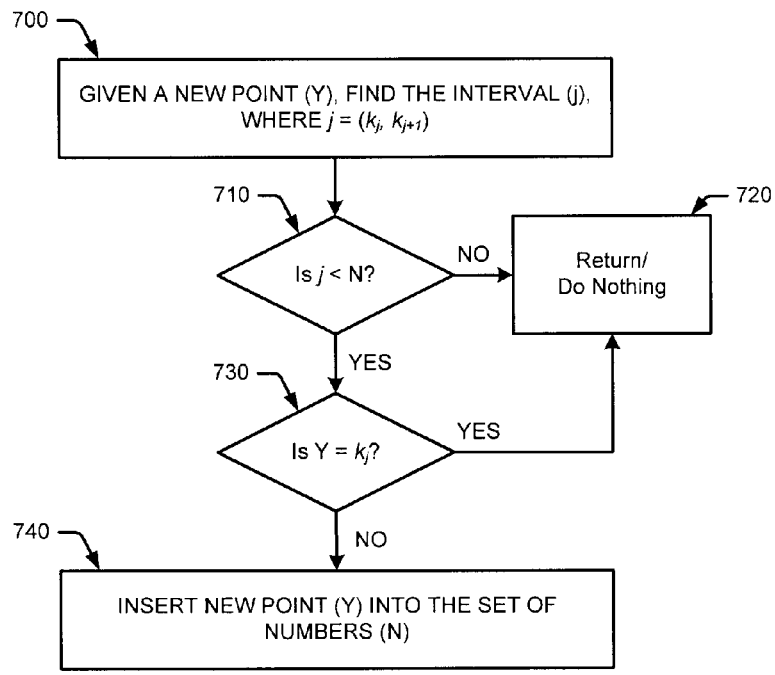
FIG. 7 is a flow chart diagram of a method, according to one embodiment of the invention, for using an interval location search to improve other database applications.

FIG. 7 is a flow chart diagram illustrating one embodiment of a method for updating a database containing a set of numbers N where each number comprises W-bits. In particular, the method shown in FIG. 7 provides an algorithm for inserting a new number Y into the set of original numbers N. Unlike the search operation of FIG. 6, which requires only one memory access, the algorithm shown in FIG. 7 requires W memory accesses to carry out updates. Therefore, the networking system described herein maintains fast search speed, but sacrifices update speed for decreased cost. Although described in the context of inserting a new number into the set of original numbers, the inventive concepts described below may be applied (with slight modification) to other database applications including, but not limited to, sorting and deleting.

In some cases, a method for inserting a new number Y into the set of original numbers N may begin by finding the interval $j=(k_j, k_{j+1})$ in which the new number belongs (in step 700). For example, at least some of the method steps shown in FIG. 6 and described above may be performed to locate the interval j. It should be understood, however, that an alternative method may be used for locating the corresponding interval in other embodiments of the invention.

Once the interval is located (in step 700), the method may determine if the interval j is less than the number N (in step 710). If the interval is equal to N (in step 710), the method may end (in step 720) without adding Y to the set of numbers (because Y is already included at N). If the interval is less than N (in step 710), the method may determine (in step 730) if the new number Y is equal to $k_j$, where j is less than or equal to N. If the new number is equal to $k_j$ (in step 730), the method may end (in step 720) without adding Y to the set of numbers (because Y is already included within the set of numbers).

Figure 8:
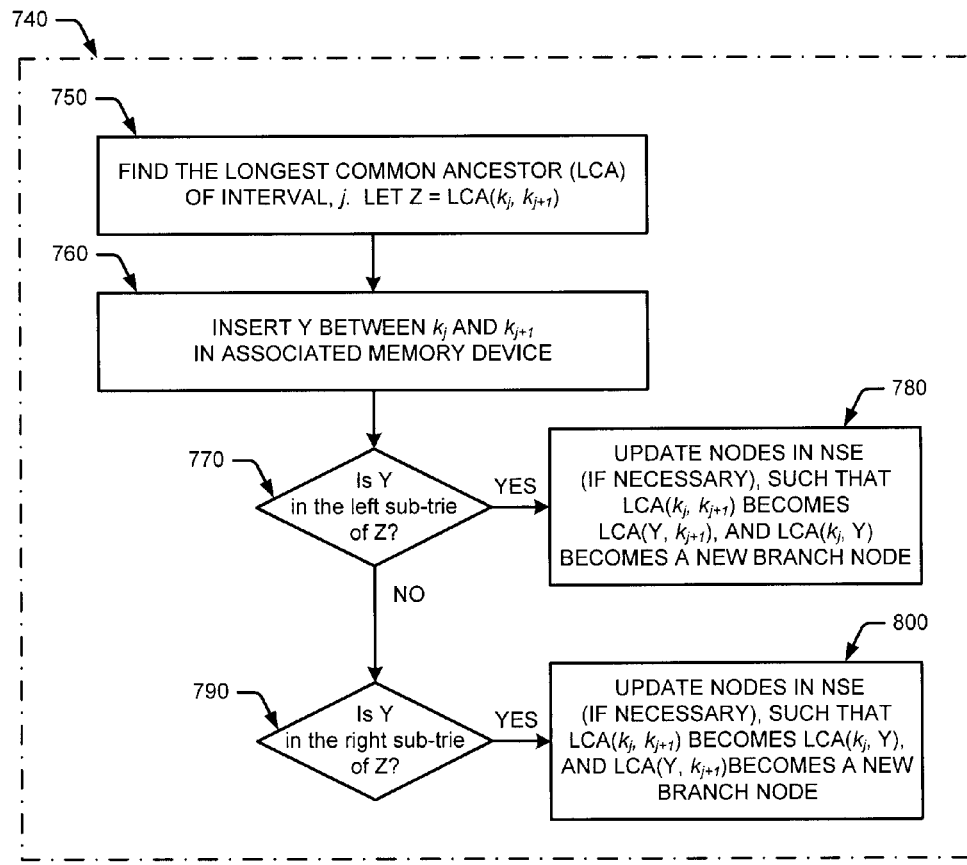
FIG. 8 is a flow chart diagram of a method, according to one embodiment of the invention, for inserting a new number Y into the set of numbers N.

However, if the interval is less than N (in step 710) and the new number is not equal to $k_j$ (in step 730), the method may insert the new number Y into the set of numbers N (in step 740). This entails possible modification to the branch nodes stored within NSE 350, as well as the data stored within the associated memory device 360. Step 740 is illustrated in more detail in the flow chart diagram of FIG. 8.

In some cases, the step of inserting a new number Y into the set of numbers N may include finding (in step 750) the longest common ancestor (LCA) of the interval j which was located in step 700 of FIG. 7. Let $Z=LCA(k_j, k_{j+1})$. Next, the method may insert new number Y into the set of numbers N (in step 760) by modifying the data stored within the associated memory device, such that $k_j \leq y < k_{j+1}$. Next, the method may update the branch nodes stored within the NSE, if the insertion of the new number necessitates such modification (e.g., if a new branch node is created by the insertion).

In some cases, the method may determine whether or not the new number Y is in the left sub-tie of Z (in step 770). In reference to FIG. 4, one example would be if $k_4$ were added to the set of numbers that did not originally include $k_4$ (or branch node X), such that branch node S was set equal to Z in step 750. In this case, after insertion of Y (in step 760), the method may update the branch nodes stored within the NSE (in step 780), such that the node at $LCA(k_j, k_{j+1})$ becomes $LCA(Y, k_{j+1})$, and $LCA(k_j, y)$ becomes a new branch node in the left sub-tie of Z.

In some cases, the method may determine whether or not the new number Y is in the right sub-tie of Z (in step 790). In reference to FIG. 4, one example would be if $k_3$ were added to the set of numbers that did not originally include $k_3$ (or branch node X), such that branch node H was set equal to Z in step 750. In this case, after insertion of Y (in step 760), the method may update the branch nodes stored within the NSE (in step 800), such that the node at $LCA(k_j, k_{j+1})$ becomes $LCA(k_j, y)$, and $LCA(Y, k_{j+1})$ becomes a new branch node in the right sub-tie of Z. Note that LCA(X,Y) for any two numbers X and Y can be done by doing a bitwise XOR operation and finding the most-significant bit that is a 1. This method can, therefore, be used to find the new branch node mentioned above.

It will be appreciated to those skilled in the art having the benefit of this disclosure that this invention is believed to provide improved networking devices and algorithms for locating an interval i within a set of numbers N given a point P. The algorithms disclosed herein improved upon previous techniques by providing fast search speeds and minimum storage consumption. Further modifications and alternative embodiments of various aspects of the invention will be apparent to those skilled in the art in view of this description. For example, instead of storing N number of branch nodes in the TCAM array, N/2 prefixes may be stored within the TCAM array with an additional 4 prefixes stored within the associated memory device. This embodiment reduces the amount of TCAM memory needed at the expense of using more SRAM memory in the associated data. However, this might be less expensive overall, since TCAM is generally much more expensive than SRAM. It is intended that the following claims be interpreted to embrace all such modifications and changes and, accordingly, the specification and drawings are to be regarded in an illustrative rather than a restrictive sense.

What is claimed is:

1. A method of determining which of a plurality of numeric intervals encompasses a search value, the method comprising:

comparing the search value to a plurality of interval definition values stored within a content addressable memory (CAM) to generate a match signal that corresponds to one of the interval definition values, each of the interval definition values defining a respective numeric interval;

retrieving a multi-field values from an associated memory that is external to the CAM in response to the match signal, the multi-field values including upper and lower boundary fields that indicate upper and lower boundaries, and values that indicate respective numeric intervals associated with the upper and lower boundaries, wherein the multi-field values are prefix left (prefixL), prefix right (prefixR), pointer less than prefix left (pointer_ltprefixL), pointer_middle, and pointer greater than or equal to prefix right (pointer_geprefixR).

2. The method of claim 1 further comprising:

comparing the search value and at least one of the upper and lower boundaries indicated by the upper and lower boundary fields to generate a comparison result.

3. The method of claim 2 wherein comparing the search value and at least one of the upper and lower boundaries comprises comparing the search value with both the upper boundary and the lower boundary.

4. The method of claim 3 wherein comparing the search value with both the upper boundary and the lower boundary comprises simultaneously comparing the search value with the upper and lower boundaries.

5. The method of claim 2 wherein comparing the search value and at least one of the upper and lower boundaries comprises comparing the search value with at least one of the upper boundary and the lower boundary within a programmed processor.

6. The method of claim 2 wherein selecting one of the values that indicate numeric values based on the comparison result comprises selecting a value that indicates a numeric interval for which the lower boundary defines an upper bound if the search value is less than the lower boundary.

7. The method of claim 2 wherein selecting one of the values that indicate numeric values based on the comparison result comprises selecting a value that indicates a numeric interval for which the upper boundary defines a lower bound if the search value is greater than the upper boundary.

8. The method of claim 2 wherein selecting one of the values that indicate numeric values based on the comparison result comprises selecting a value that indicates a numeric interval that falls between the upper and lower boundaries if the search value is greater than the lower boundary and less than the upper boundary.

9. A method for locating an interval of numbers i within a set of numbers N given a point P, the method comprising:

searching a first database of entries, each entry comprising W-bits, to find an entry having the most number of bits in common with the point P wherein the first database of entries is stored within a network search engine (NSE);

accessing a second database of entries to obtain information relating to the entry found to have the most number of bits in common with the point P wherein the second database of entries is stored within a memory device associated with, but located external to, the NSE; and comparing the point P with some of the information obtained from the second database to locate the interval of numbers i containing the point P, wherein the first database of entries comprises a plurality of branch nodes obtained by representing the set of numbers N in a binary tree configuration, wherein the second database of entries comprises a table containing a set of values for each of the plurality of branch nodes, and wherein the set of values are prefix left (prefixL), prefix right (prefixR), pointer less than prefix left (pointer_ltprefixL), pointer middle, and pointer greater than or equal to prefix right (pointer_geprefixR).

* * * * *